(12) United States Patent
Bender et al.

(10) Patent No.: US 11,011,158 B2
(45) Date of Patent: May 18, 2021

(54) ANALYZING DATA TO PROVIDE ALERTS TO CONVERSATION PARTICIPANTS

(71) Applicant: INTERNATIONAL BUSINESS MACHINES CORPORATION, Armonk, NY (US)

(72) Inventors: Michael Bender, Rye Brook, NY (US); Jeremy R. Fox, Georgetown, TX (US); Kulvir S. Bhogal, Fort Worth, TX (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 16/242,513

(22) Filed: Jan. 8, 2019

(65) Prior Publication Data

US 2020/0219488 A1 Jul. 9, 2020

(51) Int. Cl.
*G10L 15/18* (2013.01)
*G06F 16/9536* (2019.01)
(Continued)

(52) U.S. Cl.
CPC .......... *G10L 15/18* (2013.01); *G06F 16/9536* (2019.01); *G06N 20/00* (2019.01); *G10L 2015/088* (2013.01)

(58) Field of Classification Search
CPC ... H04L 65/403; H04L 65/604; H04N 21/454; H04N 21/4788
See application file for complete search history.

(56) References Cited

U.S. PATENT DOCUMENTS 5,371,673 A 12/1994 Fan
7,076,737 B2 7/2006 Abbott et al.
(Continued)

FOREIGN PATENT DOCUMENTS

WO 2017052563 A1 3/2017

OTHER PUBLICATIONS

Richler, J., "Scientific Explanations for Why Spoilers are so Horrible" https://www.theatlantic.com/entertainment/archive/2013/03/scientific-explanations-for-why-spoilers-are-so-horrible/274227/ (Mar. 2013) pp. 1-7.
(Continued)

*Primary Examiner* — Anne L Thomas-Homescu
(74) *Attorney, Agent, or Firm* — Tutunjian & Bitetto, P.C.; Michael A. Petrocelli

(57) ABSTRACT

A computer implemented method of controlling the incidence of spoilers in a conversation that includes calculating a baseline of events of interest for participants to a conversation, the calculating of the baseline including machine learning applied to interest indicators for the participants, the interest indicators being derived from data collected from social media accounts of the participants and calendars of the participants in response the participant granting permission for the data collection. The method further includes monitoring of real time conversation between the parties for keywords indicative of a topic of the real time conversation, wherein a spoiler message is predicted when the keywords substantially match the baseline for the events of interest. The method may further include sending an anti-spoiler signal to the participants of the conversation when the keywords substantially match the baseline for the events of interest.

18 Claims, 6 Drawing Sheets

(51) Int. Cl.
  *G06N 20/00* (2019.01)
  *G10L 15/08* (2006.01)

(56) References Cited

U.S. PATENT DOCUMENTS

| | | | |
|---|---|---|---|
| 7,103,806 B1 | 9/2006 | Horvitz | |
| 8,015,006 B2 | 9/2011 | Kennewick et al. | |
| 8,676,937 B2 | 3/2014 | Rapaport et al. | |
| 9,257,122 B1 | 2/2016 | Cancro et al. | |
| 9,762,719 B2 | 9/2017 | Tartz | |
| 10,321,195 B1* | 6/2019 | Nasir | H04N 21/4788 |
| 10,515,630 B1 | 12/2019 | Benkreira | |
| 2006/0106611 A1 | 5/2006 | Krasikov | |
| 2012/0236103 A1* | 9/2012 | Cahill | H04N 7/147 348/14.01 |
| 2013/0117279 A1 | 5/2013 | Massey | |
| 2014/0101244 A1* | 4/2014 | Klein | G06Q 10/101 709/204 |
| 2014/0122588 A1 | 5/2014 | Nimri | |
| 2014/0214980 A1* | 7/2014 | Jung | H04L 51/12 709/206 |
| 2014/0297260 A1* | 10/2014 | Allen | G06F 40/279 704/9 |
| 2015/0172461 A1 | 6/2015 | Cudak et al. | |
| 2015/0381689 A1* | 12/2015 | Ganesh | H04L 65/604 705/14.58 |
| 2016/0149956 A1* | 5/2016 | Birnbaum | H04L 63/101 726/1 |
| 2016/0192166 A1 | 6/2016 | Decharms | |
| 2016/0212273 A1 | 7/2016 | Tsypnyatov | |
| 2017/0046033 A1 | 2/2017 | Boss | |
| 2017/0153703 A1 | 6/2017 | Yun | |
| 2017/0154049 A1* | 6/2017 | Catalano | G06F 16/958 |
| 2018/0020095 A1 | 1/2018 | Skiba | |
| 2018/0048767 A1 | 2/2018 | Tinsman | |
| 2018/0097854 A1 | 4/2018 | Patel | |
| 2018/0152759 A1* | 5/2018 | Miller | H04N 21/454 |
| 2018/0217661 A1 | 8/2018 | Gopalakrishnan | |
| 2018/0225279 A1 | 8/2018 | Cruz Huertas et al. | |
| 2018/0261211 A1 | 9/2018 | Dolan | |
| 2018/0262803 A1* | 9/2018 | Benedetto | H04N 21/42201 |
| 2018/0293103 A1 | 10/2018 | Kalmus | |
| 2018/0356893 A1 | 12/2018 | Soni | |
| 2019/0015033 A1 | 1/2019 | Sahin | |
| 2019/0018581 A1 | 1/2019 | Aronoff | |
| 2019/0087500 A1 | 3/2019 | Danyluk | |
| 2019/0149584 A1* | 5/2019 | DiBello | H04N 21/4394 709/204 |
| 2019/0155388 A1 | 5/2019 | Lee | |
| 2019/0205753 A1 | 7/2019 | Cai | |
| 2019/0205872 A1* | 7/2019 | Tourne | G06F 16/219 |
| 2019/0208270 A1* | 7/2019 | Bates | H04N 21/43615 |
| 2019/0214122 A1* | 7/2019 | Lee | G06F 16/3344 |
| 2019/0236628 A1* | 8/2019 | Sudhindra | G06Q 50/01 |
| 2019/0268873 A1 | 8/2019 | Levesque | |
| 2019/0291010 A1* | 9/2019 | Benedetto | A63F 13/87 |
| 2020/0097840 A1* | 3/2020 | Burns | G06N 5/04 |
| 2020/0117275 A1 | 4/2020 | Chen | |
| 2020/0196231 A1 | 6/2020 | Song | |
| 2020/0293678 A1* | 9/2020 | Feuz | G06F 16/3344 |

OTHER PUBLICATIONS

List of IBM Patents or Patent Applications Treated as Related dated Jan. 8, 2019, 2 pages.
U.S. Office Action issued in U.S. Appl. No. 16/242,492, dated Jun. 24, 2020, pp. 1-14.

* cited by examiner

ANALYZING DATA TO PROVIDE ALERTS TO CONVERSATION PARTICIPANTS

BACKGROUND

Technical Field

The present invention generally relates to communications, and more particularly to managing the content of communications so that spoilers are not transmitted to people that are attending events for which the spoiler would be relevant.

Description of the Related Art

People can be sensitive to different conversation topics. While the concept of spoilers is not new, their capability are currently limited to the individual that is concerned about hearing results or endings, and there is not information supplied to those around the individual to avoid discussions.

SUMMARY

In accordance with an embodiment of the present invention, a method is provided for controlling the incidence of spoilers in conversation. In one embodiment, the method can include calculating a baseline of events of interest for participants to a conversation, the calculating of the baseline including machine learning applied to interest indicators for the participants, the interest indicators being derived from data collected from social media accounts of the participants and calendars of the participants in response the participant granting permission for the data collection. Monitoring of real time conversation between the parties for keywords indicative of a topic of the real time conversation, wherein a spoiler message is predicted when the keywords substantially match the baseline for the events of interest. The method may further include sending an anti-spoiler signal to the participants of the conversation when the keywords substantially match the baseline for the events of interest.

In another aspect, a system is provided for controlling the incidence of spoilers in conversation. In one embodiment, the system may include a registry including participants of a conversation, the registry including interest indicators selected from the group consisting of a listing of social media accounts for each of the participants, a calendar for each of the participants and a combination thereof. The system may further include a generator of events of interest list including terms that are captured from at least one of training conversation of the participants registered with the registry or captured by analyzing interest indicators registered with the registry. The system can further include a conversation monitor for spoiler topics that uses natural language processing (NLP) to discern the spoiler topics from a real time conversation between the participants. The system can further include a signal generator to send a signal to at least one of the participants that spoiler topics from the conversation substantially match values in the events of interest list.

In another aspect, the present disclosure provides a computer program product comprising a computer readable storage medium having computer readable program code embodied therein for controlling the incidence of spoilers in conversation. The computer readable storage medium may be non-transitory. The method actuated by the computer program product may include calculating a baseline of events of interest for participants to a conversation, the calculating of the baseline including machine learning applied to interest indicators for the participants, the interest indicators being derived from data collected from social media accounts of the participants and calendars of the participants in response the participant granting permission for the data collection. The method may further include monitoring of real time conversation between the parties for keywords indicative of the baseline for the events of interest, wherein a spoiler message is predicted when a frequency of keywords exceeds a threshold. The method may continue with an anti-spoiler signal being sent to the participants of the conversation.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

In some embodiments, the disclosure provides methods, systems and computer program products that control the occurrence of spoilers in conversation. The term "spoiler" denotes the telling of the outcome of a story, movie, contest, competition, or combination thereof to a person that has not yet seen the event, but intends to do so. The methods, systems and computer products described herein leverages multiple internet of things (IoT) enabled devices to learn what events a person has attended or watched, and combines that with a historical demonstrated interest to determine the probability that an individual would attend an event. In some embodiments, when the probability is sufficient to reach a threshold that the individual has demonstrated interest in an event, and has not yet attended the event, a bi-directional feedback is created to warn the individual and people he is engaged with when discussions of the event are going on. At this point, both parties are notified that the topic is one that probably should be avoided. As will be described in further detail throughout the present disclosure, a system and method of predicting items that an individual would desire not to see results of, e.g., the individual would not want to hear a spoiler of. In some embodiments, a system and method is provided that provides bi-directional feedback to individual when conversation is going towards items that should not be discussed because they would spoil the event for another individual. The systems, methods and computer program products are now described with more detail with reference to FIGS. 1-6.

Figure 1:
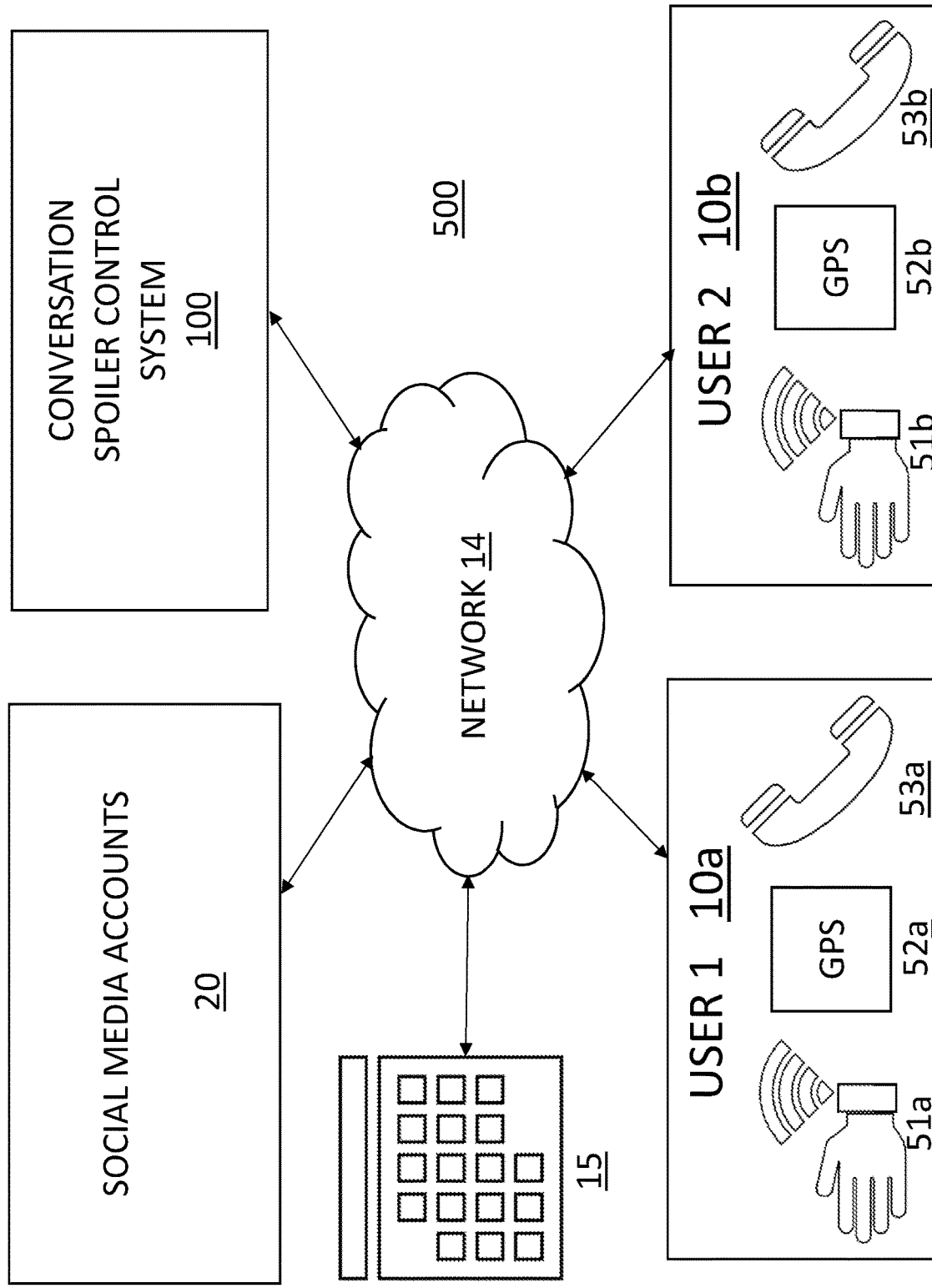
FIG. 1 is a diagram illustrating an example environment for controlling the occurrence of spoilers in conversation, in accordance with one embodiment of the present disclosure.

FIG. 1 is a diagram illustrating an example environment for determining whether a conversation topic includes a "spoiler" for an event that one party to the conversation that is intending to observe the event, but has not yet observed event.

The example environment includes a network 14 over which users, i.e., 10a, 10b, can communication via an at least two party communication session, through which a conversation spoiler control system 100 can provide feedback to participants of the conversation when the content of the conversation includes spoilers to an event that at least one of the participants, e.g., users 10a, 10b, would not want to hear because they intend to observe the event, but have not done so.

As will be described in further detail throughout, participants 10a, 10b of a conversation to be monitored by the conversation spoiler control system 100 register with the system, in which the registry information includes social media accounts 20 for each of the participants 10a, 10b. Each user 10a, 10b may also have calendar accounts 25 that are also linked through the network 14 to the conversation spoiler control system 100. As will be discussed throughout the present disclosure, the conversation spoiler control system 100 can use the social media accounts 20, as well as the calendars 25, to determine for each participant to the conversation a list of events that a participant would be interested in viewing.

Social media includes forms of electronic communication (such as websites for social networking and microblogging) through which users create online communities to share information, ideas, personal messages, and other content (such as videos). Social media are primarily Internet-based tools for sharing and discussing information among human beings. In some example, the social media accounts 20 include a category of sites that is based on user participation and user-generated content. This can be used to determine the types of events that a participant 10a, 10b to a conversation likes to attend. For example, the user may like to attend movies, or sporting events. Both of these types of events have endings that the participant 10a, 10b may not want to learn by a conversation that includes a spoiler.

The environment may also include the calendars 15 of the participants 10a, 10b. The calendar may be electronic, e.g., web based. In some embodiments, the calendars may be liked to another services, such as a participants' 10a, 10b email. The calendars 15 can be linked to the conversation spoiler control system 100 over the network 14. The calendars 15 can include information on the types of events that a participants 10a, 10b likes to attend. For example, the participants 10a, 10b may have on their calendars 15 events such as sporting events, movie nights, etc. This historical event data can be used to determine the trends regarding the events that a participant 10a, 10b likes to attend. Therefore, analysis of the calendar 15 may provide a list of events types that participants 10a, 10b would want to avoid conversation that could reveal the end of event types, such as sporting events and movies.

In example embodiments, a user, e.g., participant to the conversation 10a, 10b, participates on a call with one or more other users via a communication device 53a, 53b that is communicatively coupled via the network 14 to the conversational content control system 100. Each user 10a, 10b may include a communication device 53a, 53b through which they can listen to the conversation and participate with the conversation. The communication device 53a, 53b may comprise, but is not limited to, a phone, a wearable phone, a smartphone, tablet, laptop, multi-processor system, microprocessor-based or programmable consumer electronics, game console, set-top box, or any other device that the user may utilize to communicate over the network 14. In some embodiments, the communication device 53a, 53b may comprise a display module (not shown) to display information (e.g., in the form of user interfaces). In further embodiments, the communication device 53a, 53b may comprise one or more of a touch screen, camera, keyboard, and microphone.

Still referring to FIG. 1, each user 102a, 102b may also include a haptic feedback device 51a, 51b. The haptic feedback device 51a, 51b is also in communication with the conversation spoiler control system 100 via the network 14. In some embodiments, the haptic feedback device 51a, 51b is the device that alerts the participants 10a, 10b, if the content of the conversation being monitored by the conversation spoiler control system 100 includes spoiler content to at least one of the participants 10a, 10b of the conversation. The haptic feedback device 51a, 51b in one embodiment includes an actuator, such as, e.g., an electric motor, an electro-magnetic actuator, a voice coil, a linear resonant actuator, a piezoelectric actuator, a shape memory alloy, an electro-active polymer, a solenoid, an eccentric rotating mass motor ("ERM") or a linear resonant actuator ("LRA"), a high bandwidth actuator, an electroactive polymer ("EAP") actuator, an electrostatic friction display, or an ultrasonic vibration generator. In addition to an actuator, the haptic feedback device 51a, 51b may be a non-mechanical or non-vibratory device such as devices that use electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, etc. Multiple haptic output devices with multiple haptic effects can generate a haptic effect.

The generated haptic effects can include a wide range of effects and technologies, including vibrations, deformation, squeezing, poking, stretching, surface friction, heat, etc. A device that generates haptic effects, and includes haptic feedback device 51a, 51b can be a wearable device (e.g., a bracelet, armband, glove, jacket, vest, pair of glasses, shoes, belt, etc.), a handheld device (e.g., a mobile phone, computer mouse, etc.), haptically enabled furniture (e.g., a chair, couch, etc.) or any other haptically enabled device. In one example, the haptic feedback device 51a, 51b is a smartwatch. In another example, the haptic feedback device 51a, 51b is a Fitbit™ activity tracker available from Fitbit Inc.

The haptic feedback device 51a, 51b can include cellular radio to establish a connection to the Internet via a cellular service such as a 4G (e.g., Mobile WiMAX, LTE) or 5G cellular data service to access the network 14; or the haptic feedback device 51a, 51b may include a WiFi radio to establish a WiFi connection through a WiFi access point or router which couples the haptic feedback device 51a, 51b to the Internet (e.g., via an Internet Service Provider providing Internet service to the end user), which in turn connect to the conversation content control system 100/network 14. Of course, it should be noted that the underlying principles of the invention are not limited to any particular type of communication channel or protocol. For example, in one embodiment, the haptic feedback device 51a, 51b may be equipped with Bluetooth LE radios and protocol stacks.

It is noted that the haptic feedback device 51a, 51b may be omitted. The anti-spoiler signal to the participants 10a, 10b may be provided by any other device within the attention of the participants 10a, 10b of the conversation. For example, the signal may be auditory symbol that is emitted from the communication device through which the participants are interfacing with the conversation.

One or more portions of the network 14 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. Any one or more portions of the network 14 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The conversation spoiler control system 100 manages a communication session (also referred to as a "conversation" or "call") between the users 10a, 10b. While a total of two users or participants are shown in the conference call illustrated in FIG. 1, any number of users may be involved in the call.

As will be described in further detail throughout, the conversation spoiler control system 100 has access to the social network accounts 20 and the calendars 15 of the participants 10a, 10b. Using a cognitive computing engine, the conversation spoiler control system 100 can provide lists of terms describing events of interest for the participants 10a, 10b from the content on the social media accounts 20 and calendars 15. The lists of terms for events of interest from the social network accounts 20 and calendars 15 for the participants 10a, 10b can be used by the conversation spoiler control system 100 to provide a baseline of events of interest for the participants 10a, 10b. The baseline of events 10a, 10b may then be used during a conversation monitoring stage by the conversation spoiler control system 100 to determine whether the content of a real time conversation between the participants includes topics that could lead to a spoiler of an event of interest that one of the participants is planning on observing but has not done so at the time of the conversation.

The conversation spoiler control system 100 provides for recording the data provided by the communication devices 53a, 53b. The conversation spoiler control system 100 analyzes the data, and determines if the content of the communications session, e.g., conversation, includes topics and/or subject matter that can be characterized as being a spoiler to an event of interest of one of the participants to the conversation. Thereafter, the conversation spoiler control system 100 sends a feedback signal to the user specific haptic feedback device 51a, 51b of at least one of the participants 10a, 10b that the conversation being held includes topics that can be a spoiler to one of the participants 10a, 10b.

It is noted that the environment 500 shown in FIG. 1 is merely an example. For instance, not all components of the environment 500 may be shown. Additionally, any two or more of the systems, devices, or machines illustrated in FIG. 1 may be combined into a single system, device, or machine, and the functions described herein for any single system or machine may be subdivided among multiple systems or machines.

Any of the systems or machines (e.g., devices) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIGS. 2 and 3, and such a special-purpose computer may, accordingly, be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 2:
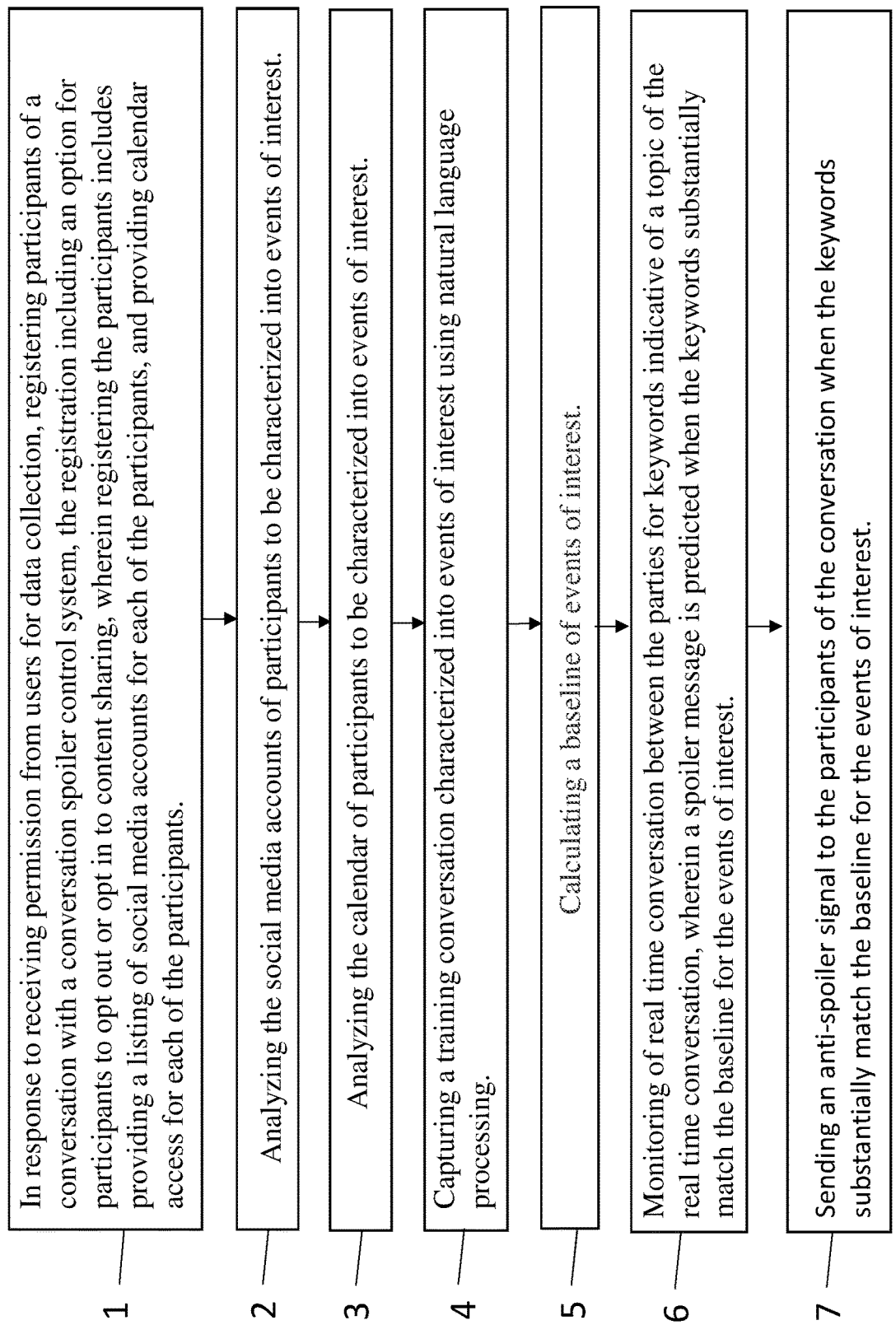
FIG. 2 is a block/flow diagram showing a method of controlling the occurrence of spoilers in conversation, in accordance with an embodiment of the present invention.

FIG. 2 is a block/flow diagram showing avoiding discussion of spoilers to participants 10a, 10b of the phone conversation. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In some embodiments, the method may begin at block 1, which can include registering participants of a conversation with a conversation spoiler control system 100. The registration step can include an option for participants 10a, 10b to opt out or opt in to content sharing. To the extent implementations of the invention collect, store, or employ personal information provided by, or obtained from, individuals (for example, current locations of drivers, historical records of drivers, etc.), such information shall be used in accordance with all applicable laws concerning protection of personal information. Additionally, the collection, storage, and use of such information may be subject to consent of the individual, i.e., user 10a, 10b, to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information. The users have the option of changing their opt-in or opt-out status at any time.

Referring to block 1 of FIG. 1, registering participants 10a, 10b of a conversation with a conversation spoiler control system 100 includes providing a listing of social media accounts 20, and calendars 15, for each of the participants 10a, 10b. Registering can also include opening a communications session with the conversation spoiler control system 100 for at least two users (10a, 10b), wherein each of the at least two users has a user specific communications device 53a, 53b registered with the system, and a user specific haptic feedback device 51a, 51b registered with the system. Registration means that addresses are provided to the conversation spoiler control system 100 so that all the devices, social media accounts 20 and calendars 15 may be reached over the network 14. Registration for the user specific communications device 53a, 53b may include the entry of phone numbers by the users into the system 100.

Referring to FIG. 2, at block 2, the method can continue with analyzing the social media accounts of participants to be characterized into events of interest. In some embodiments, the conversation spoiler controller system 100 can digest the social media accounts 20 of the participants 10a, 10b of the conversation, and can identify the events that the participants 10a, 10b have strong interests in attending. Social media are primarily Internet-based tools for sharing and discussing information among human beings. In some examples, the social media accounts 20 include a category of sites that is based on user participation and user-generated content. This can be used to determine the types of events that a participant 10a, 10b to a conversation likes to attend. For example, the user may like to attend movies, or sporting events. Both of these examples, may have specific categories of discussion on social media sites for the participants 10a, 10b of the conversation. The conversation spoiler controller system 100 can also sense from the social media accounts 20 upcoming events that the participants 10a, 10b are intending on attending. The social media accounts 20 can include postings on upcoming events, as well as include comments of upcoming events via instant message services being administered through the social media accounts 20. All of this data may be employed by the conversation spoiler control system 100 to provide a list of events that the system can employ to monitor conversations for spoilers.

Referring to block 3 of FIG. 2, the method may continue with analyzing the calendar of participants to be characterized into events of interest. Similar to the social media accounts 20, the calendars 15 can be linked to the conversation spoiler control system 100 over the network 14. The calendars 15 may be electronic, e.g., web based. In some embodiments, the calendars may be liked to another services, such as a participants' 10a, 10b email. The calendars 15 can include information on the types of events that a participants 10a, 10b likes to attend. For example, the participants 10a, 10b may have on their calendars 15 events such as sporting events, movie nights, etc. This historical event data can be used to determine the trends regarding the events that a participant 10a, 10b likes to attend. The conversation spoiler controller system 100 can also sense from the calendar 15 upcoming events that the participants 10a, 10b are intending on attending. Therefore, analysis of the calendar 15 may provide a list of events types that participants 10a, 10b would want to avoid conversation that could reveal the end of event types, such as sporting events and movies.

Figure 3:
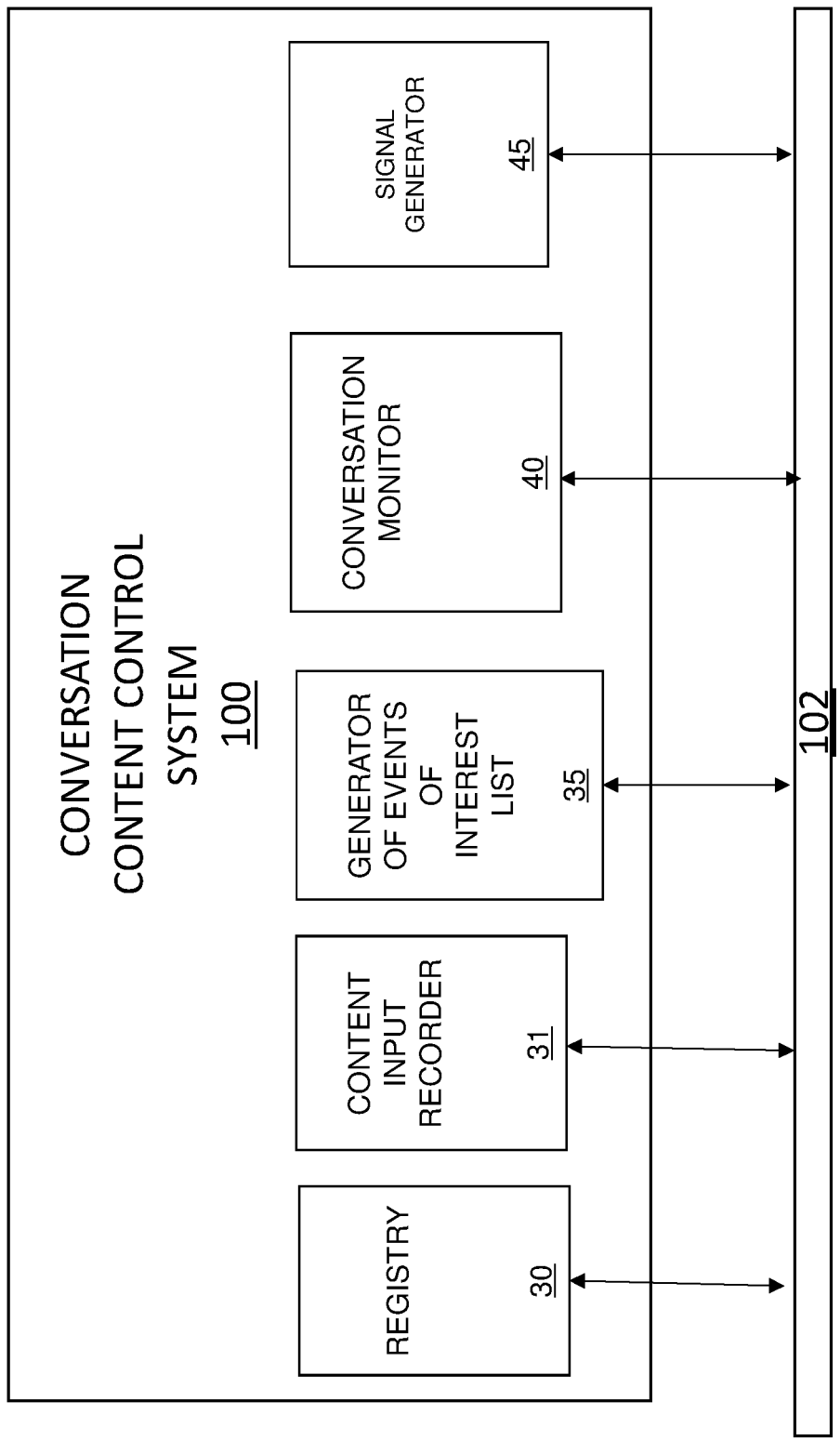
FIG. 3 is a block diagram illustrating a spoiler control system, in accordance with one embodiment of the present disclosure.

FIG. 3 is a block diagram illustrating a conversation spoiler control system 100, which includes a generator of events of interest list 35. The generator of events of interest list 35 may employ at least one cognitive computing engine to digest the social media accounts 20 and calendars 15 of the participants 10a, 10b to be characterized into the events of interest list, as described in blocks 2 and 3 of FIG. 2. The cognitive computing engine can employ at least one hardware device processor for performing a set of instruction stored on at least one memory device, in which the cognitive computing engine analyzes the data from the social media accounts 20 and calendars 15 and assigns weights to the data. The cognitive computing engine that can perform a machine learning technique, a natural language processing technique, and/or other big data techniques. For example, data in the form of concepts, ideas, topics, opinions, theories, and other like positions from the social media can be weighed by the cognitive computer engine based upon the frequency of use of each entity of data. The more prevalent the usage the higher the weight assigned by the cognitive computing engine. The highest weighted entities of data scored by the cognitive computing engine from the social media accounts 20 and calendars provides the list of events of interest.

Referring to FIG. 2, at block 4, the method may continue with capturing a training conversation characterized into events of interest for the participants 10a, 10b using natural language processing. In some embodiments, the list of events of interest generated from the social media accounts 20 and calendar 15 may be further elaborated upon with data provided from analysis of conversation recorded from the participants 10a, 10b. This conversation may be referred to as training conversation, as it is used in the development of a list of events of interest topics that is used as the baseline for a later monitoring step of the conversation. Referring to FIG. 1, training conversation may be recorded through communication devices 53a, 53b specific to the participants 10a, 10b. Referring to FIG. 3, the recorded content for the training conversation may be an input to the conversation spoiler control system 100 via an input through a content input recorder 31. The training conversation may be analyzed using natural language processing (NLP), or another form of artificial intelligence, for liked and avoidance concepts, subjects, and ideas, etc. Similar to the analysis of the social media accounts, the training conversation can be analyzed to provide a list of events of interest topics.

The list prepared from the training conversation can be compared with the list prepared from the social media accounts and the calendar. An aggregated list provided by both data sources provides increased accuracy of what words, terms, subjects and phrases by the participants' 10a, 10b can result in a spoiler in the conversation. Combining the lists of events of interest can be the products of operations of the generator of events of interest lists 35 of the conversation spoiler control system 100 that is depicted in FIG. 3. It is noted that the list of events of interest for each participant are not only generated from the participant's specific social media account 20 and calendar 15. For example, in determining the list of events of interest, the generator for the events of interest 35 may take into account overlapping interests of the other participants' with historically similar interests.

Referring to FIG. 2, at this step of the process sequence, a baseline of events of interest has been developed as illustrated in block 5.

At block 6 of FIG. 2, the method can continue with the monitoring stage of the process flow. Block 6 includes monitoring of real time conversation between the parties for keywords indicative of a topic of the real time conversation, wherein a spoiler message is predicted when the keywords substantially match the baseline for the events of interest. The monitoring stage begins, in which the conversation spoiler control system 100 receives real time input of conversation between the parties 10*a*, 10*b*; employs natural language processing (NLP) of the real time conversation to extract keyword topics from the real time input of conversation; and employs the baseline of events of interest developed at blocks 2, 3 and 4 to determine if the content of the conversation is induces a spoiler, i.e., revealed outcome or ending of an event that one of the participants is attending on experiencing, but has not done so at the time of the conversation.

In some embodiments, monitoring the real time conversation with the conversation spoiler control system 100 at block 6 of the method of FIG. 2 includes recording content of the real time conversation between the parties 10*a*, 10*b*; and analyzing terms from the real time conversation using a cognitive computing engine to provide the keyword topics to be compared with the baseline of events of interest. Similar to the analysis of the training conversation at block 4 of the method depicted in FIG. 2, the real time conversation is recorded from the user specific communications device 53*a*, 53*b*. Referring to FIG. 3, the monitoring stage of the process flow may be conducted by a conversation monitor 40 of the conversation spoiler control system 100. The conversation monitor 40 may include a cognitive computing engine can employ at least one hardware device processor for performing a set of instruction stored on at least one memory device, in which the cognitive computing engine analyzes the data from real time conversations and assigns weights to the data. The cognitive computing engine that can perform a machine learning technique, a natural language processing technique, and/or other big data techniques. For example, data in the form of concepts, ideas, topics, opinions, theories, and other like positions from the social media can be weighed by the cognitive computer engine based upon the frequency of use of each entity of data. The more prevalent the usage the higher the weight assigned by the cognitive computing engine. The highest weighted entities of data scored by the cognitive computing engine from the real time conversation during the monitoring provides keyword topics from the real time conversation analysis to be compared to the events of interest baseline produced by the generator of events of interest list 35. In some embodiments, the during the monitoring stage, the system detects communications using keywords between at least two parties, wherein the frequency of keyword usage triggers the system that a spoiler message is about to start.

Referring to FIG. 2, at block 7, the method may conclude with sending an anti-spoiler signal to at least one of the participants 10*a*, 10*b* that keyword topics from the real time conversation substantially match values in the baseline of events of interest. The conversation spoiler control system 100 sends an anti-spoiler signal that the content of a conversation likely includes spoiler information when one of the terms of the keyword topics from the analysis of the real time conversation of the monitoring at block 6 is substantially the same in meaning as an event that can be designated by the baseline of events of interest that is provided by blocks 2-5 of FIG. 2. Referring to FIG. 3, the anti-spoiler signal that the conversation includes content that can reveal the outcome of an event that the participants 10*a*, 10*b* are intending to observe, but have not already observed, is sent by a signal generator 45 of the conversation spoiler control system 100. In one embodiment, the anti-spoiler signal causes the activation of a haptic device that is worn 51*a*, 51*b* by the participant 10*a*, 10*b* that is transmitting the portion of the conversation including content that could result in a spoiler, e.g., content that can reveal the outcome of an event that the participants 10*a*, 10*b* are intending to observe, but have not already observed. In some embodiments, the haptic feedback device 51*a*, 51*b* asserts a signal by physical interaction with the user by an electric motor, an electromagnetic actuator, a linear resonant actuator, a piezoelectric actuator, a shape memory alloy, an electro-active polymer, a solenoid, an eccentric rotating mass motor ("ERM"), a linear resonant actuator ("LRA"), a high bandwidth actuator, an electroactive polymer ("EAP") actuator, an electrostatic friction display, an ultrasonic vibration generator, an electrostatic friction ("ESF") device, and ultrasonic surface friction ("USF") or a combination thereof.

In some embodiments, instead of the haptic feedback device, an audible tone may be emitted by the user specific communications device 53*a*, 53*b* to provide an anti-spoiler signal. In some embodiments, the signal is sent to all the participants of the conversation. In other embodiments, the signal can be sent to only the party transmitting the offending portions.

In some embodiments, the anti-spoiler signal is discontinued when all participants 10*a*, 10*b* have attended the event for which the anti-spoiler signal is sent. Further, in some embodiments, the system can check the participants' calendar 15 and/or social media accounts 20, to determine if the participants have attended an event before sending the anti-spoiler signal. This can be one method to avoid sending a false alert. In some embodiments, a global positioning system (GPS) 52*a*, 52*b* tracks the participants 10*a*, 10*b* to determine that said all participants 10*a*, 10*b* have attended the event. For example, if a GPS system 52*a*, 52*b* tracks a participant 10*a*, 10*b* to an event on the baseline of events list, the system can assume the participant 10*a*, 10*b* has attended the event, and that there is no need to send anti-spoiler signals to the participants 10*a*, 10*b* for this event.

FIG. 3 is a block diagram illustrating a conversation spoiler control system 100. In one embodiment, the system for avoiding spoilers in conversation may include a registry 30. The registry 30 may include identifying and/or address information for the participants 10*a*, 10*b* of a conversation. The registry 30 may also include interest indicators selected from the group consisting of a listing of social media accounts 20 for each of the participants 10*a*, 10*b*, a calendar 15 for each of the participants 10*a*, 10*b* and a combination thereof. In some embodiments, the conversation spoiler control system 100 includes a generator of events of interest list 35 including terms that are captured from at least one of training conversation of the participants 10*a*, 10*b* registered with the registry 30 or captured by analyzing interest indicators registered with the registry 30. The conversation spoiler control system 100 may further include a conversation monitor 40 for spoiler topics that uses natural language processing (NLP) to discern the spoiler topics from a real time conversation between the participants 10*a*, 10*b*. In one embodiment, the system may further include a signal generator 45 to send an anti-spoiler signal to at least one of the participants 10*a*, 10*b* that spoiler topics from the conversation substantially match values in the events of interest list.

The conversation spoiler control system 100 may be used in combination with the method described in FIG. 2. Some elements of the conversation spoiler control system 100 have already been discussed in the description of FIG. 2. It is noted that each of the aforementioned elements of the conversation spoiler control system 100 are operatively coupled via a system bus 102.

Figure 4:
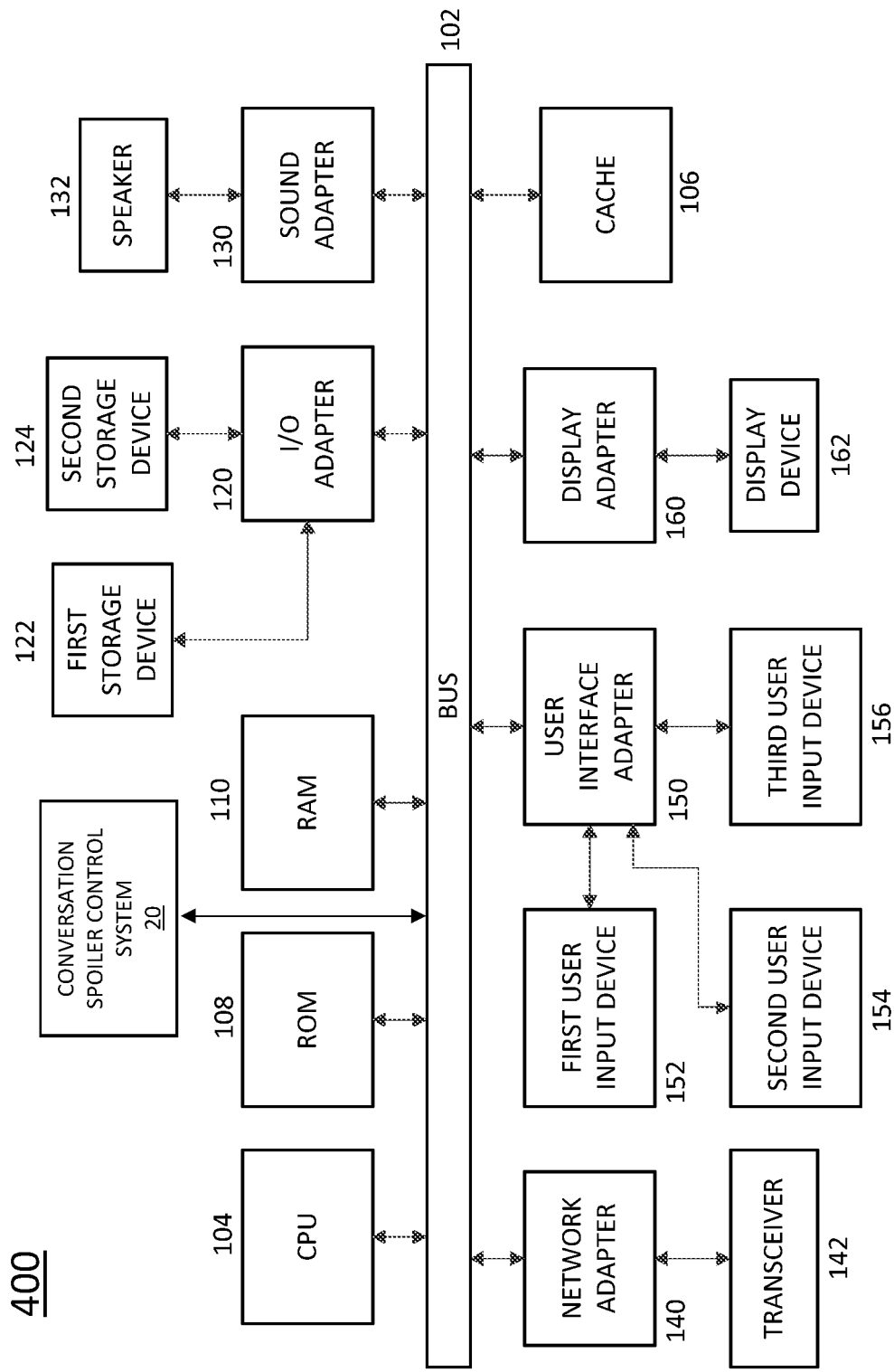
FIG. 4 is a block diagram illustrating a system that can incorporate the spoiler control system depicted in FIG. 3, in accordance with one embodiment of the present disclosure.

The conversation spoiler control system 100 may be integrated into the processing system 400 depicted in FIG. 4. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The system 400 depicted in FIG. 4, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, the present disclosure provides a computer program product comprising a computer readable storage medium, e.g., non-transitory computer readable storage medium, having computer readable program code embodied therein for controlling the incidence of spoilers in a conversation. The method actuated by the computer program product may include calculating a baseline of events of interest for participants to a conversation, the calculating of the baseline including machine learning applied to interest indicators for the participants, the interest indicators being derived from data collected from social media accounts of the participants and calendars of the participants in response the participant granting permission for the data collection; monitoring of real time conversation between the parties for keywords indicative of a topic of the real time conversation, wherein a spoiler message is predicted when the keywords substantially match the baseline for the events of interest; and sending an anti-spoiler signal to the participants of the conversation when the keywords substantially match the baseline for the events of interest. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
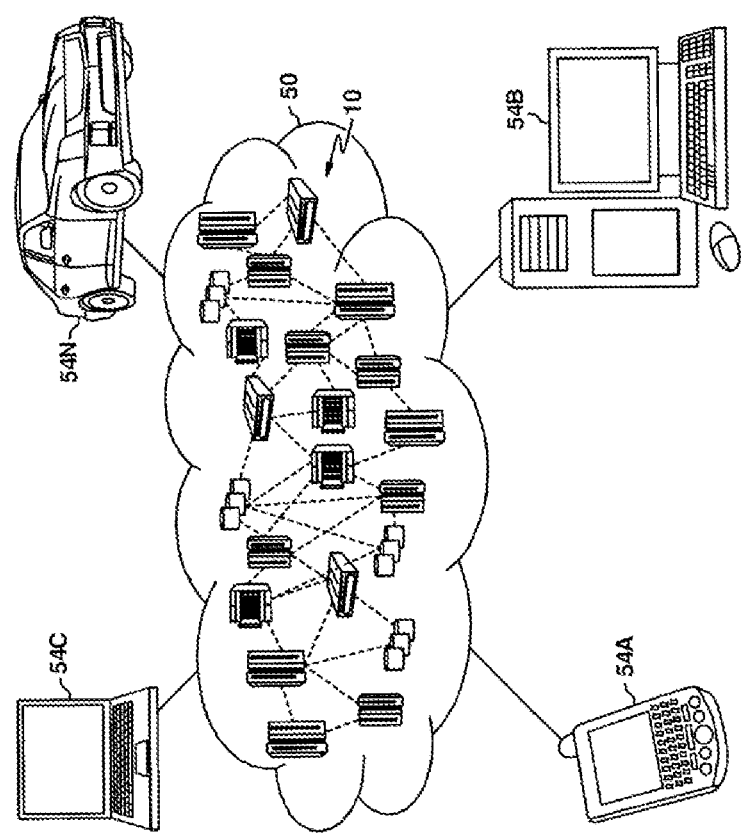
FIG. 5 depicts a cloud computing environment according to an embodiment of the present disclosure.

Referring now to FIG. 5, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 51 and cloud computing environment 50 can communicate with any type of computerized device over any type of network and/or network addressable connection (e.g., using a web browser).

Figure 6:
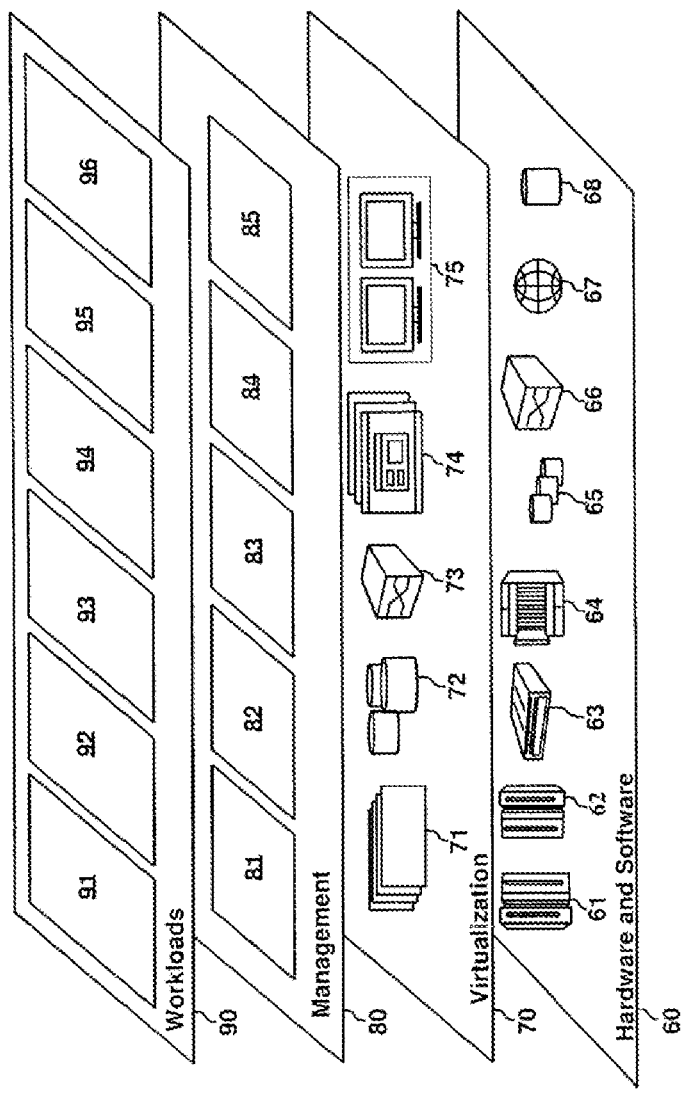
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application for the conversation spoiler control system 100, which is described with reference to FIGS. 1-5.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a method of feedback prior to watching entertainment (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer implemented method of analyzing communications for a group of user to detect spoilers in the group communications, comprising:
    calculating a baseline of events of interest for participants to a conversation, the calculating of the baseline including machine learning applied to interest indicators for the participants, the interest indicators being derived from data collected from social media accounts of the participants and calendars of the participants in response the participant granting permission for the data collection;
    monitoring of real time conversation between parties for keywords indicative of a topic of the real time conversation, wherein a spoiler message is predicted when the keywords substantially match the baseline for the events of interest; and sending an anti-spoiler signal to the participants of the conversation when the keywords substantially match the baseline for the events of interest, wherein said anti-spoiler signal comprises an activation of a haptic feedback device on the participant that is transmitting the portion of the conversation including said keywords that substantially match the baseline for the events of interest.

2. The computer implemented method of claim 1, wherein the calculating of the baseline further includes natural language processing of a training period of the conversation between the parties.

3. The computer implemented method of claim 1, further comprising receiving permission from a participant to register the participant with a conversation spoiler control system, wherein said registering includes linking social media accounts and personal calendars of said participants to the conversation spoiler control system.

4. The computer implemented method of claim 3, wherein said calculating the baseline of events of interest for the participants to the conversation by machine learning applied to interest indicators for the participants is performed by a cognitive computing engine of the conversation spoiler control system.

5. The computer implemented method of claim 4, wherein the calculating of baseline of events of interest for the participants comprises selecting said events of interest by similarity to historical events on said calendar.

6. The computer implemented method of claim 5, wherein the calculating of the baseline of events of interest for the participants comprises selecting events of interest by similarity to events identified on participants social media pages.

7. The computer implemented of claim 6, wherein the social media accounts are internet based tools for sharing information about the participants.

8. The computer implemented method of claim 1, wherein the monitoring of the real time conversation between the parties for the keywords indicative of the topic of the real time conversation comprises natural language processing (NLP).

9. The computer implemented method of claim 1, wherein the sending of the anti-spoiler signal to the participants of the conversation comprises sending the anti-spoiler signal to a participant that is transmitting a portion of the conversation including the keywords indicative of a spoiler.

10. The computer implemented method of claim 1, wherein the user haptic feedback device asserts a signal by physical interaction with the user by an electric motor, an electro-magnetic actuator, a linear resonant actuator, a piezoelectric actuator, a shape memory alloy, an electro-active polymer, a solenoid, an eccentric rotating mass motor ("ERM"), a linear resonant actuator ("LRA"), a high bandwidth actuator, an electroactive polymer ("EAP") actuator, an electrostatic friction display, an ultrasonic vibration generator, an electrostatic friction ("ESF") device, and ultrasonic surface friction ("USF") or a combination thereof.

11. The computer implemented method of claim 1, wherein the signal is discontinued when all participants have attended the event for which the anti-spoiler signal is sent.

12. The computer implemented method of claim 11, wherein the calendar of the participants indicates all participants have attended the event.

13. The computer implemented method of claim 11, wherein a global positioning system (GPS) tracks the participants to determine that said all participants have attended the event.

14. A system for controlling the incidence of spoilers in conversation comprising:

a registry including participants of a conversation, the registry including interest indicators selected from the group consisting of a listing of social media accounts for each of the participants, a calendar for each of the participants and a combination thereof;

a generator of events of interest list including terms that are captured from at least one of training conversation of the participants registered with the registry or captured by analyzing interest indicators registered with the registry;

a conversation monitor for spoiler topics that uses natural language processing (NLP) to discern the spoiler topics from a real time conversation between the participants; and a signal generator to send a signal to at least one of the participants that spoiler topics from the conversation substantially match values in the events of interest list, wherein said signal comprises activation of a haptic feedback device on a participant that is transmitting the spoiler topics from the conversation substantially match values in the events of interest list.

15. The system of claim 14, wherein the generator of events of interest list comprises:

an input for receiving audio content of the training conversation in real time;

a natural language processing engine to analyze terms from the training conversation to provide avoidance topics;

a social media input for receiving data from the social media accounts;

a calendar input for receiving data from the calendar; and a cognitive computing engine for generating the events of interest list with topic terms from the calendar, topic terms from the social media accounts, and topic terms provided by the natural language processing engine analysis of the training conversation.

16. A computer program product comprising a computer readable storage medium having computer readable program code embodied therein for controlling the incidence of spoilers in a conversation, the method comprising:

calculating a baseline of events of interest for participants to a conversation, the calculating of the baseline including machine learning applied to interest indicators for the participants, the interest indicators being derived from data collected from social media accounts of the participants and calendars of the participants in response the participant granting permission for the data collection;

monitoring of real time conversation between the parties for keywords indicative of a topic of the real time conversation, wherein a spoiler message is predicted when the keywords substantially match the baseline for the events of interest; and sending an anti-spoiler signal to the participants of the conversation when the keywords substantially match the baseline for the events of interest, wherein said anti-spoiler signal comprises activation of a haptic feedback device on a participant that is transmitting a portion of the conversation including said keywords that match the baseline for the events of interest.

17. The computer program product of claim 16, further comprising receiving permission from a participant to register the participant with a conversation spoiler control system, wherein said registering includes linking social media accounts and personal calendars of said participants to the conversation spoiler control system.

18. The computer program product of claim 17, wherein said calculating the baseline of events of interest for the participants to the conversation by machine learning applied to interest indicators for the participants is performed by a cognitive computing engine of the conversation spoiler control system.

\* \* \* \* \*